UNITED STATES PATENT OFFICE.

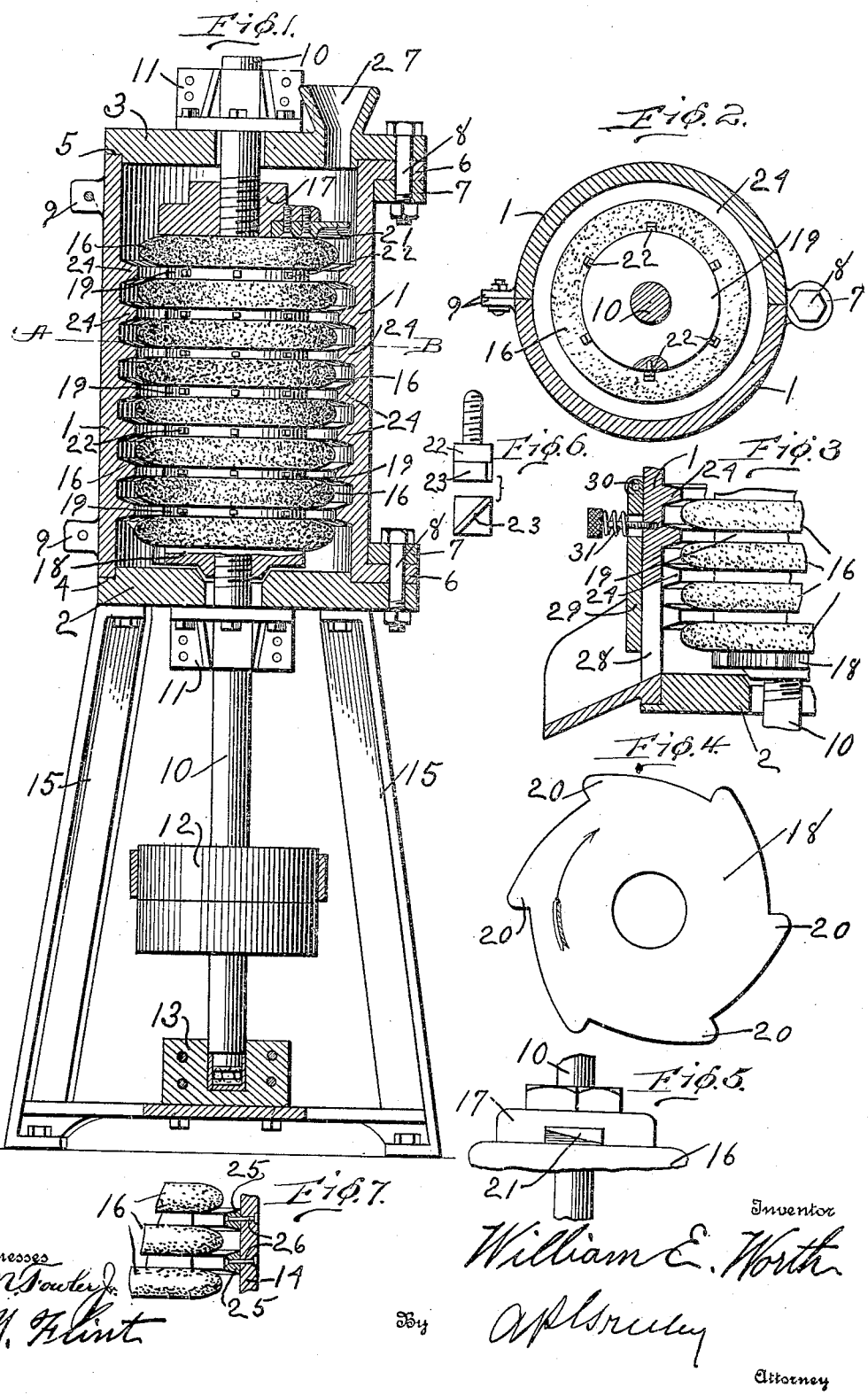

WILLIAM E. WORTH, OF WILMINGTON, NORTH CAROLINA, ASSIGNOR TO UNITED STATES COTTON SEED OIL COMPANY, OF PORTLAND, MAINE, A CORPORATION OF MAINE.

COTTON-SEED-DELINTING MACHINE.

958,456.  Specification of Letters Patent.  Patented May 17, 1910.

Application filed May 6, 1909. Serial No. 494,501.

*To all whom it may concern:*

Be it known that I, WILLIAM E. WORTH, a citizen of the United States, residing at Wilmington, in the county of New Hanover, State of North Carolina, have invented certain new and useful Improvements in Cotton-Seed-Delinting Machines, of which the following is a description, reference being had to the accompanying drawings, forming a part hereof.

My invention relates to machines for removing from cotton seed the comparatively small portion of short cotton fiber which remains upon the seed after the cotton has passed through a suitable gin and as much as possible of the cotton fiber removed from the seed, the purpose being to clean the seed whereby they are rendered more desirable for planting or for other uses and to recover the short cotton fiber or lint for such uses as it may be adapted to. Such machines are commonly known as delinting machines, and the object of my invention is to provide an improved cotton seed delinting machine for the purpose stated which will be effective and one which will be simple in construction, easily manufactured and one which will thoroughly clean the seed without injuring them.

With these objects in view my invention consists in the improved cotton seed delinting machine shown in the accompanying drawing, described in the following specification, and particularly claimed in the clauses of the concluding claim, and in such obvious modifications of the device disclosed as will occur to one skilled in the art to which machines of the character disclosed relate.

In the accompanying drawing wherein an embodiment of my invention is illustrated: Figure 1 is a view chiefly in vertical section of my machine but with some of the parts thereof shown in elevation, Fig. 2 is a view showing a section taken upon a horizontal plane indicated by the line A—B Fig. 1, Fig. 3 is a fragmentary view showing a section of my machine taken upon a vertical plane passing through the discharge opening and spout through which the seed and lint escape, Fig. 4 is a plan view illustrating an element of my machine, Figs. 5 and 6 are detail views illustrating elements of my machine, and Fig. 7 is a fragmentary view illustrating an alternative construction of one of the elements of my machine.

In the drawing, 1 represents the external casing of my machine which is formed ordinarily of metal and is circular in cross-section.

2 is the lower head or base, and 3 the upper head, these heads being provided with annular rabbets 4, 5.

The external casing 1 is imperforate and is made up of two parts, and said parts are provided with lugs 6, 7 whereby said parts may be hinged to the heads 2, 3 by means of bolts 8, thereby providing a construction in which either half of the external casing may be opened to expose the interior of the machine.

9 are lugs upon the casing 1 whereby the two parts thereof may be bolted together. The upper and lower ends of the casing 1 engage the rabbets 4 and 5 when the external casing is closed as will be understood from the drawing.

10 is a vertical shaft extending through the casing 1, 11 are bearings for said shaft, 12 is a pulley whereby said shaft may be driven, and 13 is a bearing for supporting the lower end of the shaft 10.

15 are legs whereby the machine is supported.

16 denotes abrasive disks carried by the shaft 10 and located within the casing 1, a plurality of which disks are employed in each machine, and which may be formed from emery, carborundum, or other suitable abrasive material; or such disks may comprise a body portion of material not in itself abrasive but with a layer of abrasive material upon its periphery; the essential feature being that the periphery of the disks which contact with the seed shall be abrasive in character. The number of such abrasive disks in a machine is of secondary importance so far as the essential features of my invention are concerned, and the proper number will be determined by experiment and with reference to the best results under the greatest number of the varying conditions under which the machine would be required to operate. I have illustrated a machine with eight disks which number I have found to secure a very satisfactory and effectively operating machine, although I have used a greater and also a lesser number without sacrificing any of the advantages of my machine considered with reference to the results secured thereby.

The shaft 10 is threaded, and a follower 17 and an element 18 which I refer to as a knocker or pusher, because of the function which it performs, are provided, said elements having threaded openings to engage the threaded portion of the shaft 10.

The numeral 19 refers to a plurality of separating plates or disks formed preferably of metal and preferably circular in form and arranged in alternation with the abrasive disks 16 to thereby form in connection with said abrasive disks a single rotary abrasive element having a plurality of circumferentially extending ridges upon its periphery formed by the projecting convex edges of the several abrasive disks, which ridges are spaced apart so as to secure an effective operation of the abrasive element by means of the plates or disks 19; and it will be understood that the abrasive disks 16 and interposed separating disks 19 are clamped together and to the shaft 10 by means of the follower 17 and pusher 18 to thereby form a single unitary abrasive member driven by said shaft.

The pusher 18 is provided with a plurality of projections 20 as shown in Fig. 4; and the follower 17 is provided with a blade 21 secured in a recess formed therein, the outer end of said blade being formed with an inclined surface like a propeller blade, as shown in Fig. 5, the purpose of which blade is to force the seed downward with a slight pressure as they are engaged by said blade.

The abrasive disks 16 are convex at their periphery as shown and are separated from one another as above explained by the disks 19 which are of lesser diameter than the abrasive disks and are preferably provided each with a plurality of projections 22, Fig. 2, shown as set screws provided with an inclined wing or projection 23, Fig. 6, which wing, however, may be dispensed with. The purpose of these projections 22, considered by themselves and also in connection with other elements hereinafter referred to, is to prevent the seed from adhering to one another and thus forming lumps, or to keep the seeds separate from one another as much as possible and to keep the seed and lint within the machine stirred up so that the whole surface of each separate seed will at some time be acted upon by the abrasive disks. This tendency of the seed to form lumps is particularly present in the upper portion of the machine and before any considerable part of the lint has been removed from the seed. As the lint or adherent short cotton fiber is progressively removed from the seed as they pass downward this tendency to form lumps becomes less and the necessity for the projections 22 also less. I prefer, however, to provide all of the separating disks 19 with projections such as 22 as shown.

The inner surface of the imperforate casing 1 is provided with a plurality of annular baffles or deflecting elements 24 located opposite the separating disks 19 and, consequently, between successive abrasive disks 16, so that the seed after having been acted upon by any particular abrasive disk will, as they pass downward, engage the adjacent annular baffle or deflecting element and be deflected inward toward the next lower abrasive disk of the series, and a like action will take place with reference to each successive disk and baffle throughout the machine. A further action of these baffles is that they act by themselves and also in combination with the projections 22 to prevent the formation of lumps as above described, and to thus keep the seed and lint within the machine loose and stirred up during the operation of the machine; and a further result secured by the elements referred to is that the seed is continually turned so that the entire surface thereof will be operated upon.

From the above it will be understood that the seed pass downward through the space between the rotary abrasive member and the external casing of the machine and are deflected toward the abrasive disks and kept stirred in the manner explained. The space between the abrasive element and casing will be full of seed and lint loosely packed together when the machine is in operation; and it will be understood that the shortest distance between any part of the abrasive element and the external casing or deflecting elements is materially greater than any dimension of an individual seed, so that the seed is not as it were clamped or held between parts of the machine at any time during the process of removing the lint or short cotton fiber therefrom.

The annular baffles 24 are shown in Figs. 1, 2 and 3 as formed upon and in one piece with the casing 1. They may, however, be formed separately as shown at 25, Fig. 7, in which case they are secured to the casing 14 by rivets 26.

27 is a hopper through which seed is supplied to the machine, and 28 is a discharge opening having a spout as shown and through which the cleaned seed and lint leave the machine, it being understood that both the seed and lint or short cotton fiber remain together within the machine during the operation thereof in removing the lint from the seed, and both the cleaned seed and the lint which has been separated therefrom are discharged together through the opening 28 after the seed has been operated upon as aforesaid and the lint removed therefrom.

The discharge opening 28 is provided with a swinging door 29 pivoted at 30 and terminating short of the bottom wall of the opening 28, and 31 is a spring acting upon such door to keep it closed. One of the purposes of this feature is to provide a sort of a safety device to prevent the machine from becoming clogged and to compensate for irregularities in the rate at which the seed is supplied to the machine. In the normal operation of the machine the discharge of cleaned seed and lint will take place beneath the lower end of the door 29 and without swinging the door upon its support. If, however, a mass of seed and lint collects and the machine is in danger of becoming clogged the force of the spring 31 will be overcome and the door opened to permit the discharge of the seed and lint. A further function performed by the spring pressed door is to subject the seed and lint to a slight uniform back pressure, it being understood that when in operation the machine is full of seed and lint which mass is being continuously forced downward and thus subjected to slight pressure by the action of the inclined end of the blade 21.

The purpose of the pusher or knocker 18 is to push any seed or lint which may tend to accumulate in the space bounded by the outer portion of the lower head and the lower end of the outer casing 1 and beneath the lower abrasive disk, and which accumulation if it occurred would interfere with the operation of the machine, outward and through the discharge opening 28.

Having thus described my invention and explained the mode of operation thereof, I claim and desire to secure by Letters Patent:

1. In a cotton seed delinting machine, a vertically arranged rotary shaft; a plurality of abrasive disks upon said shaft; a plurality of separating disks upon said shaft and arranged in alternation with said abrasive disks; a vertically arranged imperforate casing surrounding said disks and located adjacent thereto; a plurality of deflecting elements within said casing and disposed between adjacent abrasive disks; and means for supplying seed to be operated upon to the upper portion of said casing, said casing being provided with an opening at its lower end through which the seed and lint are discharged.

2. In a cotton seed delinting machine, a vertically arranged rotary shaft, a plurality of abrasive disks upon said shaft; a plurality of separating disks upon said shaft and arranged in alternation with said abrasive disks; a vertically arranged imperforate casing surrounding said disks and located adjacent thereto; a plurality of deflecting elements within said casing; and means for supplying seed to be operated upon to the upper portion of said casing, said casing being provided with an opening at its lower end through which the seed and lint are discharged.

3. In a cotton seed delinting machine, a vertically arranged rotary shaft; a plurality of abrasive disks upon said shaft; a plurality of separating disks upon said shaft and arranged in alternation with said abrasive disks; a vertically arranged imperforate casing surrounding said disks and located adjacent thereto; a plurality of deflecting elements within said casing and disposed between adjacent abrasive disks; means for supplying seed to be operated upon to the upper portion of said casing; and means whereby the seed and lint are discharged from the lower portion of said casing.

4. In a cotton seed delinting machine, a vertically arranged rotary shaft, a plurality of abrasive disks upon said shaft; a plurality of separating disks upon said shaft and arranged in alternation with said abrasive disks; a vertically arranged imperforate casing surrounding said disks and located adjacent thereto; a plurality of deflecting elements within said casing; means for supplying seed to be operated upon to the upper portion of said casing, said casing being provided with an opening at its lower end through which the seed and lint are discharged; and a rotary element carried by said shaft and disposed adjacent said opening and provided with a series of projections whereby the seed and lint are pushed outwardly from said shaft.

5. In a cotton seed delinting machine, a vertically arranged rotary shaft; a plurality of abrasive disks upon said shaft; a plurality of separating disks upon said shaft and arranged in alternation with said abrasive disks and each of said separating disks having a plurality of projections upon its periphery; a vertically arranged imperforate casing surrounding said disks and located adjacent thereto; a plurality of deflecting elements within said casing and disposed between adjacent abrasive disks; and means for supplying seed to be operated upon to the upper portion of said casing, said casing being provided with an opening at its lower end through which the seed and lint are discharged.

6. In a cotton seed delinting machine, a vertically arranged rotary shaft; a plurality of abrasive disks upon said shaft; a plurality of separating disks upon said shaft and arranged in alternation with said abrasive disks and each of said separating disks having a plurality of projections upon its periphery; a vertically arranged imperforate casing surrounding said disks and located adjacent thereto; a plurality of deflecting elements within said casing; and means for supplying seed to be operated upon to the upper portion of said casing, said casing being provided with an opening at its lower end through which the seed and lint are discharged.

7. In a cotton seed delinting machine, a vertically arranged rotary shaft; a rotary abrasive member carried by said shaft and provided upon its periphery with a plurality of circumferentially extending ridges; a vertically arranged imperforate casing surrounding said abrasive member and located adjacent thereto; a plurality of deflecting elements within said casing and adapted to deflect the seed toward said abrasive member; and means for supplying seed to be operated upon to the upper portion of said casing, said casing being provided with an opening at its lower end through which the seed and lint are discharged.

8. In a cotton seed delinting machine, a vertically arranged rotary shaft; a rotary abrasive member carried by said shaft and provided upon its periphery with a plurality of circumferentially extending ridges; a vertically arranged imperforate casing surrounding said abrasive member and located adjacent thereto; a plurality of deflecting elements within said casing and disposed between adjacent ridges of said abrasive member and adapted to deflect the seed toward said abrasive member; and means for supplying seed to be operated upon to the upper portion of said casing, said casing being provided with an opening at its lower end and through which the seed and lint are discharged.

9. In a cotton seed delinting machine, a vertically arranged rotary shaft; a plurality of abrasive disks upon said shaft; a plurality of separating disks upon said shaft and arranged in alternation with said abrasive disks; a vertically arranged imperforate casing surrounding said abrasive disks and located adjacent thereto; a plurality of annular deflecting elements within said casing; and means for supplying seed to be operated upon to the upper portion of said casing, said casing being provided with an opening at its lower end through which the seed and lint are discharged.

10. In a cotton seed delinting machine, a vertically arranged rotary shaft; a plurality of abrasive disks upon said shaft; a plurality of separating disks upon said shaft and arranged in alternation with said abrasive disks; a vertically arranged imperforate casing surrounding said disks and located adjacent thereto; a plurality of annular deflecting elements within said casing and disposed between adjacent abrasive disks; and means for supplying seed to be operated upon to the upper portion of said casing, said casing being provided with an opening at its lower end through which the seed and lint are discharged.

11. In a cotton seed delinting machine, a vertically arranged rotary shaft; a plurality of abrasive disks upon said shaft; a plurality of separating disks upon said shaft and arranged in alternation with said abrasive disks; a vertically arranged imperforate casing surrounding said disks and located adjacent thereto; a plurality of deflecting elements within said casing; means for supplying seed to be operated upon to the upper portion of said casing, said casing being provided with an opening at its lower end through which the seed and lint are discharged; a door for said opening; a spring for maintaining said door in a normally closed condition; and a blade carried by said shaft and located at the upper end of said casing and provided with an inclined portion adapted to engage and press down the seed.

12. In a cotton seed delinting machine, a vertically arranged rotary shaft; a plurality of abrasive disks upon said shaft; a plurality of separating disks upon said shaft and arranged in alternation with said abrasive disks and each of said separating disks having a plurality of projections upon its periphery; a vertically arranged imperforate casing surrounding said disks and located adjacent thereto; a plurality of deflecting elements within said casing; means for supplying seed to be operated upon to the upper portion of said casing, said casing being provided with an opening at its lower end through which the seed and lint are discharged; a door for said opening; a spring for maintaining said door in a normally closed condition; and a blade carried by said shaft and located at the upper end of said casing and provided with an inclined portion adapted to engage and press down the seed.

13. In a cotton seed delinting machine, a vertically arranged rotary shaft; a rotary abrasive member carried by said shaft and provided upon its periphery with a plurality of circumferentially extending ridges; a vertically arranged imperforate casing surrounding said abrasive member and located adjacent thereto; a plurality of deflecting elements within said casing and adapted to deflect the seed toward said abrasive member; means for supplying seed to be operated upon to the upper portion of said casing, said casing being provided with an opening at its lower end through which the seed and lint are discharged; a door for said opening; a spring for maintaining said door in a normally closed condition; and a blade carried by said shaft and located at the upper end of said casing and provided with an inclined portion adapted to engage and press down the seed.

14. In a cotton seed delinting machine, a vertically arranged rotary shaft; a rotary abrasive member carried by said shaft and provided on its periphery with a plurality of circumferentially extending ridges; a vertically arranged imperforate casing surrounding said abrasive member and located adjacent thereto; a plurality of deflecting elements within said casing and disposed between adjacent ridges of said abrasive member and adapted to deflect the seed toward said abrasive member; means for supplying seed to be operated upon to the upper portion of said casing, said casing being provided with an opening at its lower end and through which the seed and lint are discharged; a door for said opening; a spring for maintaining said door in a normally closed condition; and a blade carried by said shaft and located at the upper end of said casing and provided with an inclined portion adapted to engage and press down the seed.

15. In a cotton seed delinting machine, a vertically arranged rotary shaft; a rotary abrasive member carried by said shaft and provided upon its periphery with a plurality of circumferentially extending ridges; a vertically arranged imperforate casing surrounding said abrasive member and located adjacent thereto; a plurality of deflecting elements within said casing and adapted to deflect the seed toward said abrasive member; and means for supplying seed to be operated upon to the upper portion of said casing, said casing being provided with an opening at its lower end through which the seed and lint are discharged; a door for said opening; and a spring for maintaining said door in a normally closed condition.

16. In a cotton seed delinting machine, a vertically arranged rotary shaft; a rotary abrasive member carried by said shaft and provided upon its periphery with a plurality of circumferentially extending ridges; a vertically arranged imperforate casing surrounding said abrasive member and located adjacent thereto; a plurality of deflecting elements within said casing and adapted to deflect the seed toward said abrasive member; means for supplying seed to be operated upon to the upper portion of said casing, said casing being provided with an opening at its lower end through which the seed and lint are discharged; and a blade carried by said shaft and located at the upper end of said casing and provided with an inclined portion adapted to engage and press down the seed.

17. In a cotton seed delinting machine, a vertically arranged rotary shaft; a plurality of abrasive disks upon said shaft; a plurality of separating disks upon said shaft and arranged in alternation with said abrasive disks and each of said separating disks having a plurality of projections upon its periphery; a vertically arranged imperforate casing surrounding said disks and located adjacent thereto; a plurality of annular deflecting elements within said casing and disposed between adjacent abrasive disks; a blade carried by said shaft and located at the upper end of said casing and provided with an inclined portion adapted to engage and press down the seed; and means for supplying seed to be operated upon to the upper portion of said casing, said casing being provided with an opening at its lower end through which the seed and lint are discharged; a door for said opening; a spring for maintaining said door in a normally closed condition; and a rotary element carried by said shaft and disposed adjacent said opening and provided with a series of projections whereby the seed and lint are pushed outwardly from said shaft.

This specification signed and witnessed this third day of May A. D. 1909.

WILLIAM E. WORTH.

In presence of—
W. B. METTS,
R. L. JOHNSON.